Feb. 3, 1959 E. M. ZACHARIAS, JR 2,871,958
CULTIVATOR ATTACHMENTS
Filed May 3, 1957 2 Sheets-Sheet 1

INVENTOR
Ellis Mark Zacharias, Jr.

BY *Ogle P. Singleton*

ATTORNEY

Feb. 3, 1959 — E. M. ZACHARIAS, JR — 2,871,958
CULTIVATOR ATTACHMENTS
Filed May 3, 1957
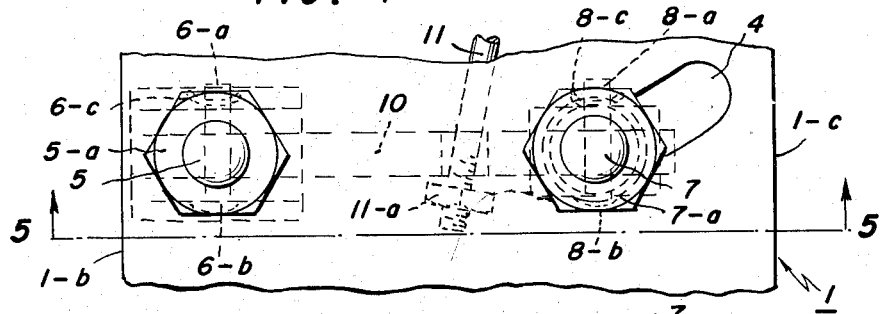
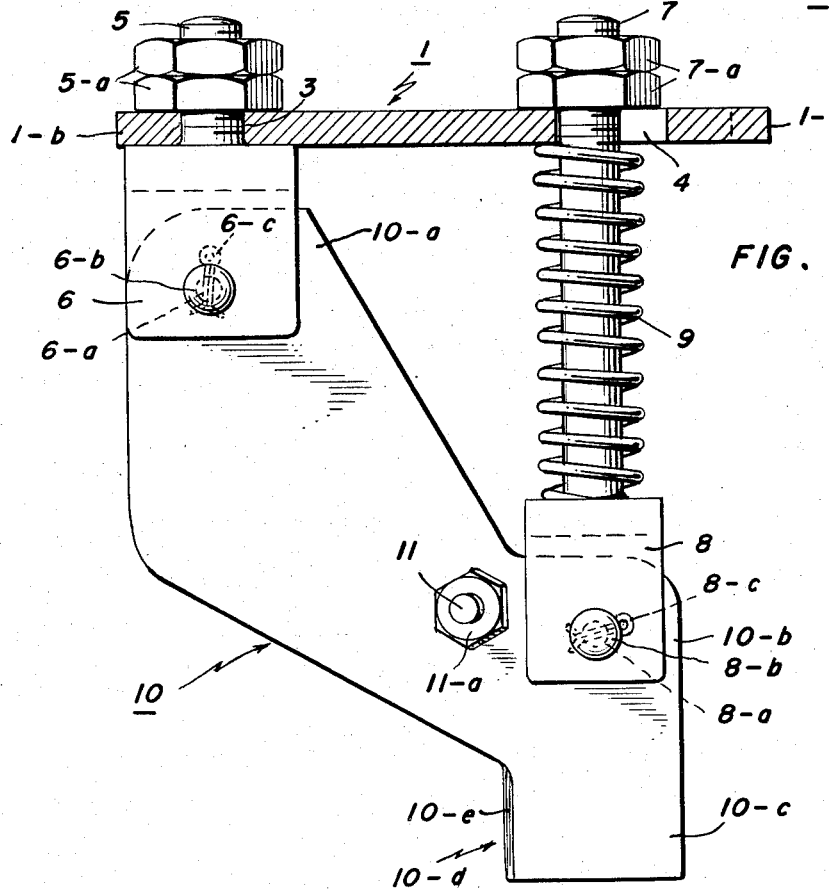
INVENTOR
Ellis Mark Zacharias, Jr.
ATTORNEY

United States Patent Office 2,871,958
Patented Feb. 3, 1959

2,871,958

CULTIVATOR ATTACHMENTS

Ellis M. Zacharias, Jr., Livingston, N. J.

Application May 3, 1957, Serial No. 656,819

3 Claims. (Cl. 172—96)

My invention consists in a new and useful improvement in Cultivator Attachments and constitutes a considerable improvement upon the attachment disclosed in my co-pending application Serial Number 626,334. The form disclosed and claimed herein has two novel features, viz. a peculiar configuration of each of the cutter blades, and a tie-rod connecting the two blades, to counteract centrifugal force exerted by the rotating bar carrying the blades.

While I illustrate in the drawings and hereinafter fully describe one specific embodiment of my invention, it is to be distinctly understood that I do not consider my invention to be limited to said embodiment but refer for its scope to the claims appended hereto.

In the drawings:

Fig. 4 is an enlarged, fragmentary, top plan of the attachment.

Fig. 5 is a vertical section on the line 5—5 of Fig. 4 in the direction of the arrows.

Figure 1:
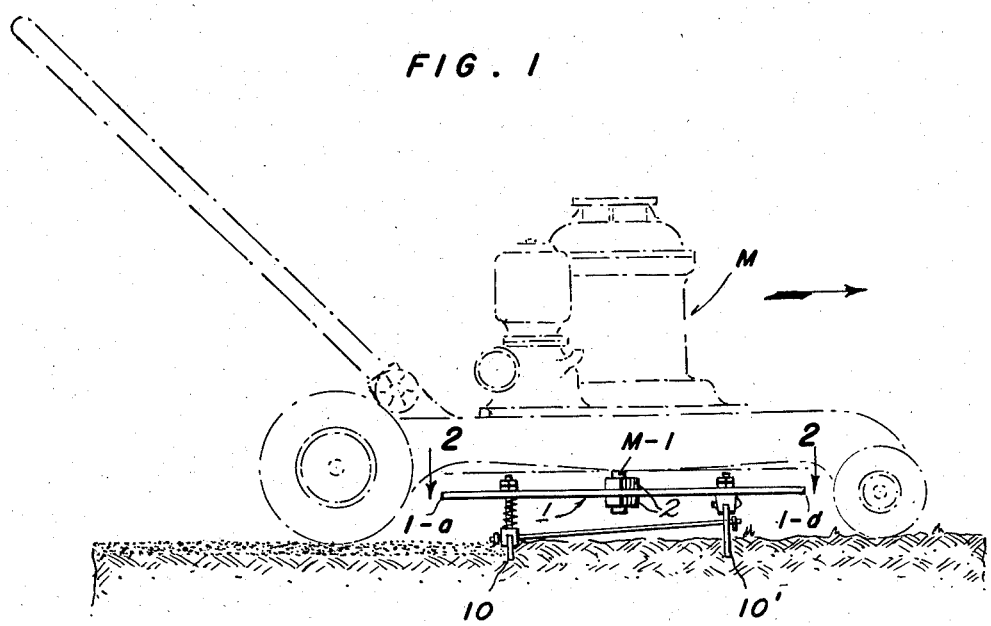
Fig. 1 is a side elevation of my improved cultivator attachment mounted on a rotary power mower shown in broken lines, a portion of which is broken away.
Figure 2:
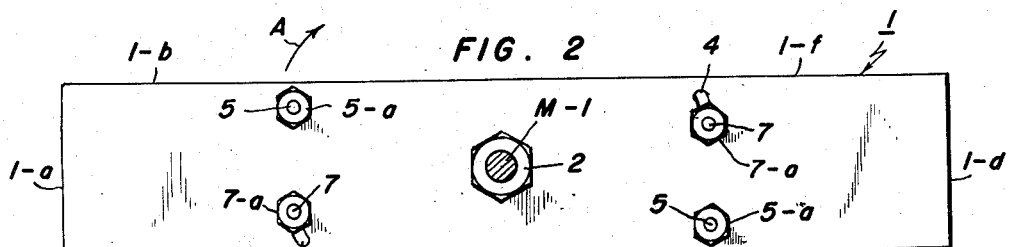
Fig. 2 is a horizontal section on the line 2—2 of Fig. 1, in the direction of the arrows.

As shown in the drawings, the mower M has a vertical driving shaft M–1 to carry the cutting blade which has been removed. A suitable bar 1 replacing the cutting blade is removably mounted on the shaft M–1 by any suitable means, such as nuts 2. This bar 1 has between its end 1–a and the shaft M–1 an internally threaded bore 3 adjacent the leading edge 1–b of the portion of the bar 1 to the left of the shaft M–1 (Figs. 1 and 2), relative to its direction of rotation indicated by arrows A, clockwise as shown in Fig. 2. The bar 1 has a transverse, curved slot 4 adjacent the trailing edge 1–c of the portion of the bar to the left of the shaft M–1 (Figs. 1 and 2). A forward support pin 5 is threaded in the bore 3 and is provided on its lower end with a yoke 6. The pin 5 has suitable lock nuts 5–a for fixing the pin 5 in adjusted position relative the bar 1. A rear support pin 7 passes loosely through the slot 4 and has on its upper end nuts 7–a bearing on the top of the bar 1. The pin 7 has on its lower end a yoke 8. An expansion spring 9 is coiled about the pin 7 and bears between the yoke 8 and the bar 1, thereby biasing the pin 7 downwardly.

A cultivator blade 10 has its upper, forward end 10–a pivotally mounted in the yoke 6 by a pintle 6–a having a head 6–b on one end and a cotter pin 6–c on the other end. The blade 10 has a rearwardly extending tail 10–b which is pivotally mounted in the yoke 8 by a pintle 8–a having a head 8–b on one end and a cotter pin 8–c on the other end.

As clearly shown in Fig. 5, the blade 10 has a tongue 10–c depending from the tail 10–b and provided on its leading edge 10–d with a suitable cutting edge 10–e.

It will be noted that, by reason of the peculiar configuration of this cultivator blade 10 which is a considerable improvement over the blade disclosed in my co-pending application Serial Number 626,334, the cutting edge 10–e is disposed at the rear portion of the blade 10 which undergoes the maximum rise when the blade 10 is forced backwardly by an obstruction.

Figure 3:
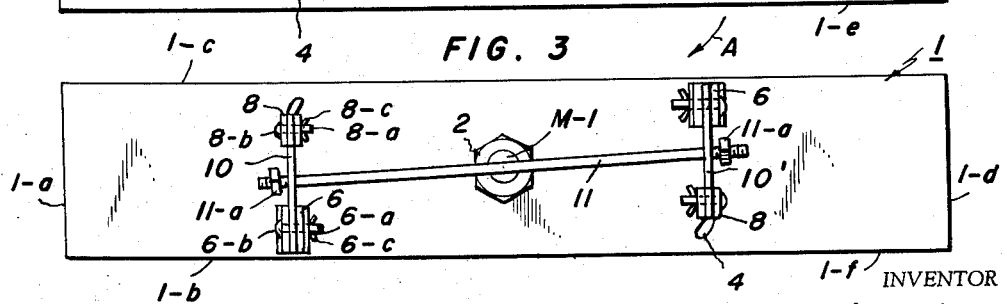
Fig. 3 is a bottom plan of the attachment.

As clearly shown in Figs. 1 and 3, the bar 1 carries a second cultivator blade 10' between its end 1–d and the shaft M–1. This blade 10' is mounted on the bar 1 by structure of the same character as above described for mounting the blade 10. The blade 10' is disposed on the bar 1 reversely to the disposition of the blade 10, so that the forward end of blade 10' is disposed toward the leading edge 1–e of the portion of the bar 1 to the right of the shaft M–1 (Figs. 1 and 2) and the rear end of the blade 10' is disposed toward the trailing edge 1–f of the portion of the bar 1 to the right of the shaft M–1 (Figs. 1 and 2).

It is to be noted (Figs. 1 and 2) that the two blades 10 and 10' are symmetrically disposed on the bar 1 relative to the shaft M–1.

In this improved form of my device, I provide a tie-rod 11 (Fig. 3) which is mounted on the blades 10 and 10' by nuts 11–a. It will be noted that the rod 11 passes loosely through the blades 10 and 10' so as to afford free, independent oscillation of the blades on their pivots. The function of this rod 11 is to counteract the centrifugal force exerted by the bar 1 when rotated at high speed. I have found by experience that the centrifugal force exerted by the bar rotating at 3600 R. P. M. tends to bend the blades outwardly and cause undue friction in the blade-mounting yokes, interfering with free movement of the blades in their yokes. The rod 11 functions to prevent these disadvantages.

It is obvious, as disclosed in my co-pending application Serial Number 626,334, that my improved cultivator blades 10 and 10' can be mounted directly on the cutter blade of the mower M, eliminating the bar 1.

Having described my invention, what I claim is:

1. In a cultivator attachment for a rotary power lawn mower having a vertical driving shaft, for cultivating soil over which the mower is moved, the combination of a bar adapted to be removably and adjustably mounted on the shaft for rotation thereby; and a cultivator blade so removably mounted on said bar as to produce a circular furrow in the soil when the bar is rotated and the mower is moved over the soil, said blade having a forward portion pivotally mounted at the leading edge of said bar, a rearwardly extending tail slidably supported at the trailing edge of said bar, and a tongue depending from said tail, its forward edge constituting a cutting edge, and said tongue being biased into position for producing said furrow.

2. An attachment, according to claim 1, having a yoke fixed on said bar, in which said forward portion of said blade is pivoted, and a second yoke slidably mounted on said bar, in which said tail is pivoted.

3. An attachment, according to claim 1, having a pair of said blades, and a tie-rod so connecting said blades as to counteract centrifugal force exerted by said bar on said blades, and permit free, independent oscillation of said blades relative said bar.

References Cited in the file of this patent

UNITED STATES PATENTS

| | | |
|---|---|---|
| 2,545,173 | Shaw | Mar. 13, 1951 |
| 2,720,071 | Watanabe | Oct. 11, 1955 |